(12) United States Patent
Hayashi

(10) Patent No.: US 7,408,314 B2
(45) Date of Patent: Aug. 5, 2008

(54) CONTROL DEVICE FOR MOVABLE BODY

(75) Inventor: Takao Hayashi, Inuyama (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 148 days.

(21) Appl. No.: 11/590,863

(22) Filed: Nov. 1, 2006

(65) Prior Publication Data

US 2007/0103107 A1    May 10, 2007

(30) Foreign Application Priority Data

Nov. 4, 2005   (JP)   .............................. 2005-320691
Jan. 27, 2006  (JP)   .............................. 2006-018474

(51) Int. Cl.
    *G05D 1/10*   (2006.01)
(52) U.S. Cl. .............................. 318/568.12; 318/568.18; 187/222
(58) Field of Classification Search ................ 318/560, 318/565, 567, 568.12, 568.16, 568.17, 568.18, 318/580, 583, 592, 602; 901/1; 187/222, 187/224, 227; 212/284, 288
    See application file for complete search history.

(56) References Cited

U.S. PATENT DOCUMENTS

| | | | |
|---|---|---|---|
| 5,215,166 A | * | 6/1993 | Pipes .......................... 187/238 |
| 5,887,268 A | * | 3/1999 | Furukawa ..................... 701/23 |
| 6,041,274 A | * | 3/2000 | Onishi et al. .................. 701/26 |
| 2002/0143442 A1 | * | 10/2002 | Uehara ........................ 701/23 |
| 2005/0021196 A1 | * | 1/2005 | Moriguchi .................... 701/23 |
| 2005/0065655 A1 | * | 3/2005 | Hong et al. .................. 700/245 |
| 2005/0203699 A1 | * | 9/2005 | Moriguchi ................... 701/200 |

FOREIGN PATENT DOCUMENTS

| JP | 3-267206 A | | 11/1991 |
|---|---|---|---|
| JP | H07-179203 | * | 7/1995 |
| JP | 7-334241 A | | 12/1995 |
| JP | 2004-287555 A | | 10/2004 |

* cited by examiner

*Primary Examiner*—Bentsu Ro
(74) *Attorney, Agent, or Firm*—Westerman, Hattori, Daniels & Adrian, LLP.

(57) ABSTRACT

An encoder 13 determines the remaining travel distance of a stacker crane to perform deceleration control. When a linear sensor 8 determines an absolute distance from the stop position, the linear sensor 8 performs deceleration control, and when a mark sensor 26 detects a mark 36, the mark sensor 26 performs stop control. Likewise, deceleration control is performed based on the remaining elevation distance determined by an encoder 19. When a linear sensor 9 determines an absolute distance from the stop position, the linear sensor 9 performs deceleration control, and when the mark sensor 26 detects the mark 36, the mark sensor 26 performs stop control.

6 Claims, 12 Drawing Sheets

CONTROL DEVICE FOR MOVABLE BODY

TECHNICAL FIELD

The present invention relates to stop control for a movable object such as a stacker crane, a turn table, or a hand of a robot.

BACKGROUND ART

In operating a movable object such as a stacker crane or a hand of a robot, it is necessary to stop the movable object correctly and swiftly at a large number of stop positions. In this regard, according to the disclosure of Japanese Laid Open Patent Publication No. 3-267206, a mark is provided at each shelf of an automated warehouse, and a sensor of the stacker crane recognizes the mark. Stop data for stopping the stacker crane at each shelf is stored in a memory. However, if there is any change in a drive-train over time such as abrasion of travel wheels, or if deformation of the shelf occurs, it is not possible to stop the movable object at a correct position using the stop data stored in the memory. Therefore, there is a demand for the control which makes it possible to stop the movable object correctly and swiftly at the stop position even if there is any change over time on the moveable body side or on the stop position side.

SUMMARY OF THE INVENTION

An object of the present invention is to provide a technique for allowing a movable object to stop at a stop position correctly and swiftly even if there is any change over time on the movable object side or on the stop position side, or an adjustment error due to the temperature or the like.

Another object of the present invention is to provide a technique for allowing the movable object to stop swiftly from the next time.

Still another object of the present invention is to provide a technique for making it possible to perform the maintenance at a suitable timing.

Still another object of the present invention is to provide a technique for automatically correcting data of a target stop position during transportation of an article without any influence by the change on the stop position side or abrasion of wheels of a transportation apparatus.

Still another object of the present invention is to provide a technique for allowing the movable object to stop in accordance with data of a target stop position, while improving the reliability in detecting an error in the data of the target stop position.

Still another object of the present invention is to make it possible to determine the error in the data of the target stop position more accurately.

According to the present invention, a control device for determining a position of a movable object relative to a stop position by a sensor to stop the movable object at the stop position is provided. The control device comprises an encoder for detecting the movement distance of the movable object, a linear sensor for outputting a linear output for an absolute distance from a position before the stop position to the stop position, and a mark sensor for detecting a mark provided at the stop position. As the movable object gets closer to the stop position, the control is switched in the order of the encoder, the linear sensor, and the mark sensor to stop the movable object at the stop position.

Preferably, the control device further comprises means for correcting the absolute distance to the stop position outputted by the linear sensor, in response to the result of detection of the mark by the mark sensor.

Further, preferably, the control device further comprises means for determining an error in the output of the linear sensor at the stop position in response to the result of detection of the mark by the mark sensor, means for accumulating the determined error, and means for requesting the maintenance of the movable object or the maintenance on the stop position side if the accumulated error satisfies a predetermined condition.

Further, according to the present invention, a transportation apparatus for transferring an article is provided. The transportation apparatus is configured to stop in accordance with data of a target stop position which is stored in advance for a stop position. The transportation apparatus comprises means for detecting a mark provided at the stop position, at the time of stopping at the stop position during actual transportation of the article, means for determining an error in data of the target stop position based on data provided by the detection means, and means for correcting the data of the target stop position from the next time based on the determined error.

Preferably, the transportation apparatus further comprises a linear sensor for detecting an absolute position based on the stop position to stop the transportation apparatus at the stop position by the fully closed stop control using the linear sensor.

Further, preferably, the transportation apparatus further comprises transfer means for transferring the article by moving back and forth from/to the stop position. The transfer means is provided with the detection means for detecting the mark in a state in which the transfer means has moved forward to the stop position.

In the present invention, under deceleration control by an encoder, a movable object moves to a position where a linear sensor can determine an absolute distance from a stop position. Then, by switching to the control by the linear sensor, deceleration control is performed until the movable object moves to a position where a mark sensor can detect a mark. When the mark sensor detects the mark, stop control is performed. As a result, the movable object can stop at the stop position correctly and swiftly.

Further, in the present invention, teaching of data for stop control is not required before starting operation of the movable object. If a plurality of stop positions are provided two-dimensionally or three-dimensionally, it may not be possible to provide detectable plates detected by the linear sensor, for all of the stop positions. Therefore, the detectable plates are provided only along the axis in the travel direction or the axis along the elevation direction. In the case, the present invention is particularly advantageous. Even in this case, it is easy to provide marks at the respective stop positions. The linear sensor performs deceleration control until the movable object comes to a position where the mark is supposed to be present. By detecting the mark, the movable object can stop correctly and swiftly.

If the output of the linear sensor is corrected, the movable object can stop at the stop position correctly and swiftly without requiring any very slow movement or the like before the stop position.

If the error is accumulated to determine whether the accumulated error satisfies a predetermined condition, the maintenance on the stop position side or the maintenance on the movable object side can be performed at a suitable timing.

In the present invention, it is possible to correct data of the target stop position without any influence such as the change on the stop position side or abrasion of travel wheels of the transportation apparatus. Further, it is possible to correct the data of the target stop position in the process of actually transporting the article. Further, since data of the target stop position can be corrected repeatedly, it is possible to gradually, and reliably achieve the correct data over the repeated corrections. Thus, even if the data of the target stop position is deviated from the actual correct data due to the change on the stop position side or the change on the transportation apparatus side, the deviation can be corrected during transportation of the article. It is possible to always obtain the correct data of the target stop position.

In the case where the movable object is stopped in accordance with the data of the target stop position by the fully closed control using the linear sensor, the movable object can stop even more correctly, and it is possible to improve the reliability in the error of the data of the target stop position.

If the mark is detected when the transfer means has moved forward to reduce the distance to the mark, it is possible to detect the error of the data of the target stop position more accurately, or it is possible to detect the mark using an inexpensive sensor.

Figure 1:
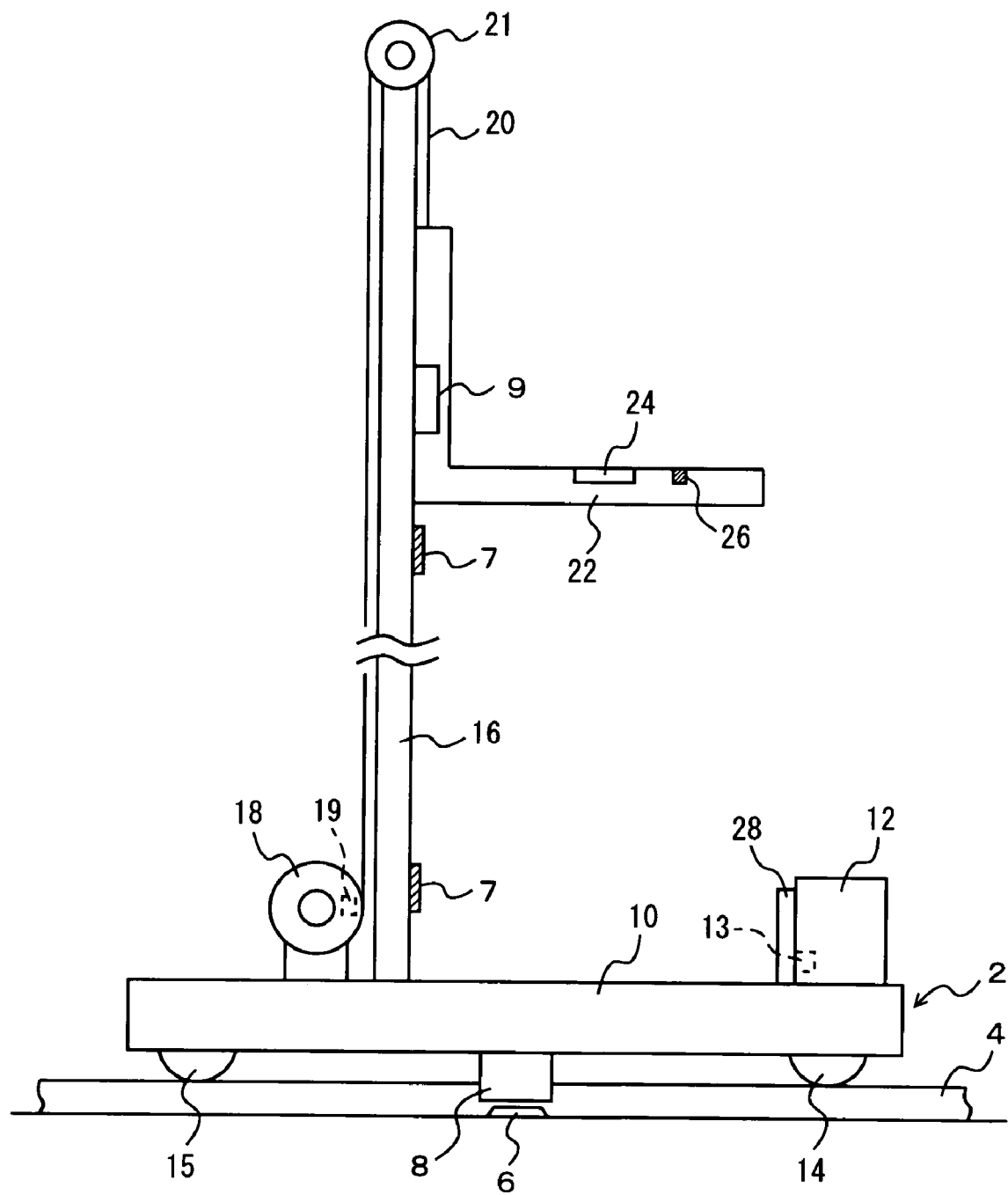
FIG. 1 is a side view showing main components of a stacker crane used in an embodiment.

BRIEF DESCRIPTION OF THE SYMBOLS 2 stacker crane
4 travel rail
6,7 detectable plate
8,9 ABS linear sensor
10 cart
12 travel motor
13,19 encoder
14 drive wheel
15 driven wheel
16 mast
18 elevation motor
20 suspension member
21 sieve
22 elevation frame
24 slide fork
26 mark sensor
28 control device
30 rack
32 pillar
34 shelf support
36 mark
38 cross sign
40 error memory
41 error data at the first address of the shelf
42 analyzing unit
50 target area
51,52 concentric circles
53 center of the viewing field of the mark sensor
54,55 border line
56,57 encoder
58 travel target position memory
59 elevation target stop position memory
60 turn table
62 body of the turn table
64 rotary shaft
66 rotary motor
68 drive shaft
70 encoder
72 linear rotary sensor
74 mark sensor
76 detectable plate
78 mark
80 motor control device
81,82 controlling drive unit
83 on machine controller
84 accumulator
85 lateral feed unit
86 lateral feed motor
87 encoder
88,89 ABS linear sensor
90,91 detectable plate
92 memory
93 overhead traveling vehicle
94 travel rail
95 movable object
96 rotary unit
97 elevation drive unit
98 elevation frame
99 suspension member
100 check
101 cassette
102 buffer
103 pillar

EMBODIMENTS

Hereinafter, embodiments in the most preferred form for carrying out the present invention will be described.

FIGS. 1 to 6 show an embodiment and its modified form. FIG. 1 to 5 show stop control of a stacker crane 2 according to the embodiment. A reference numeral 4 denotes a travel rail, and a reference numeral 6 denotes a detectable plate fixed on the ground side. For example, the detectable plate 6 is a magnetic plate. A plurality of the detectable plates 6 are provided at intervals at the front sides of rack shelves along the travel rail 4. Further, the detectable plates 6 may be provided on the bottom of a rack 30 in FIG. 2. A reference numeral 8 denotes an ABS linear sensor having a plurality of coils (not shown) for detecting an absolute position of the stacker crane 2 in the horizontal direction based on the position of the magnetic detectable plate 6, by the change of magnetic coupling with the detectable plate 6. Instead of using the ABS linear sensor 8, any sensor may be used as long as it can detect the absolute position based on a target stop position.

A reference numeral 10 denotes a cart, and a reference numeral 12 denotes a travel motor. An encoder 13 detects the rotation amount of a drive shaft of the travel motor 12. A reference numeral 14 denotes a drive wheel, and a reference numeral 15 denotes a driven wheel. The encoder 13 may be provided at the drive wheel 14 or the driven wheel 15. The encoder 13 determines the travel distance of the cart 10. A control device 28 controls the travel motor 12 based on the remaining travel distance to the stop position. A reference numeral 16 denotes a mast. A plurality of detectable plates 7 are provided in correspondence with the height positions of a plurality of shelves arranged vertically along the rack 30 in FIG. 2. An ABS linear sensor 9 provided at the elevation frame 22 is used for detecting the detectable plates 7.

A reference numeral 18 denotes an elevation motor, and a reference numeral 19 denotes an encoder for detecting the rotation amount of the drive shaft of the elevation motor 18. The encoder 18 may detect the rotation amount of a sieve 21 or the like. A reference numeral 20 denotes a suspension member such as a belt, a wire, or a rope. A reference numeral 22 denotes the elevation frame. A slide fork 24 as an example of transfer means is provided. Mark sensors 26 such as image sensors are provided on both left and right sides of the elevation frame 22 (in the direction toward the rack 30 in FIG. 2). Instead of the rotary motor, a liner motor or an actuator such as a servo cylinder may be used for the travel motor 12 or the elevation motor 18.

The detectable plates 6 and 7 are provided at intervals. The ABS linear sensors 8, 9 detect the absolute positions based on the positions of the individual detectable plates 6, 7. The control device 28 of the stacker crane 2 controls the travel motor 12 and the elevation motor 18 to perform travel control and elevation control. In the case where stop data (the height position of the elevation frame 22 and the position in the travel direction of the cart 10) is stored for each shelf, deceleration control is performed by the motors 12, 18 to stop the stacker crane 2 in accordance with the stop data. In the case where the stop data is not stored for each shelf, deceleration control is performed to stop the stacker crane 2 at the positions of the detectable plates 6, 7 corresponding to the shelf.

The stop position corresponding to the shelf of the rack or the station is a two-dimensional position defined by combination of the position in the traveling direction and the position in the elevation direction. However, the detectable plate is not provided at each shelf. The detectable plates 6, 7 are provided along the travel rail 4 and the mast 16. Therefore, there are errors (differences) between the stop positions based on the detectable plates 6, 7 and the positions of the shelves.

Figure 2:
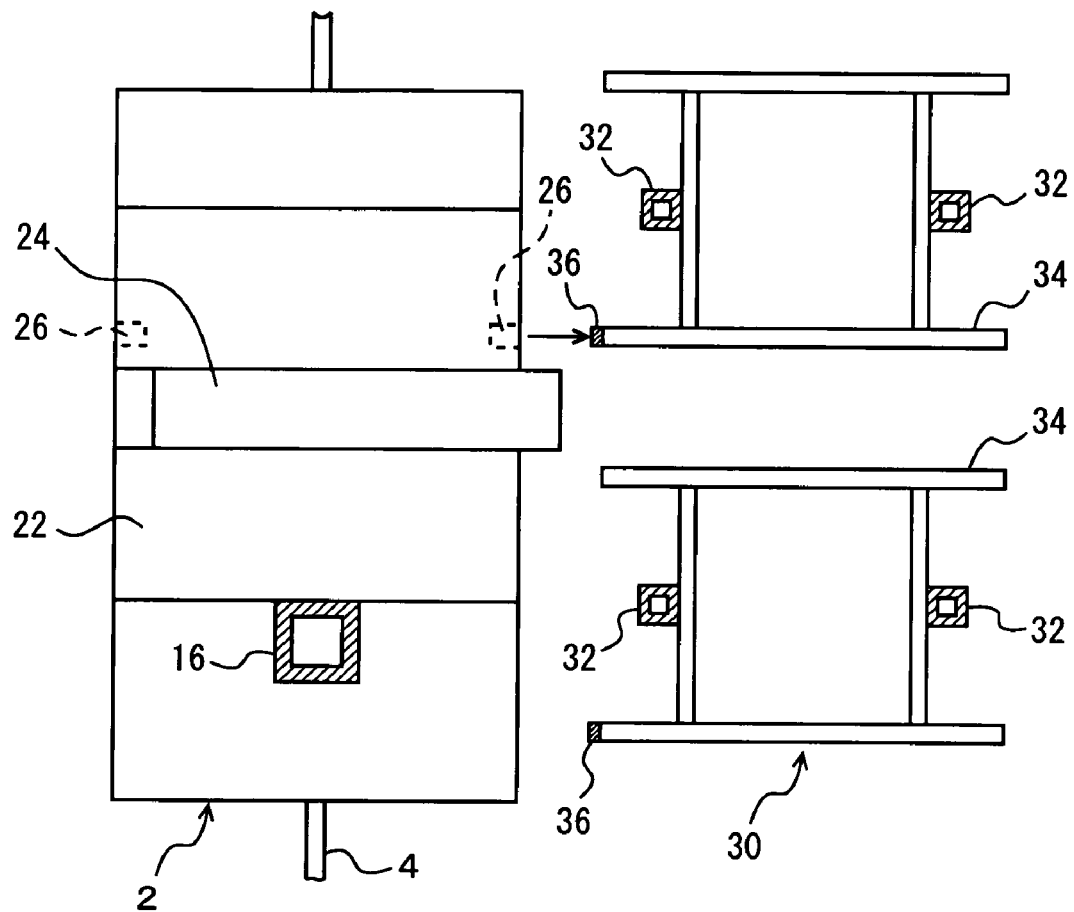
FIG. 2 is a plan view showing an elevation frame of the stacker crane and marks provided at shelf supports of a rack as stop positions in the embodiment.

As shown in FIG. 2, a slide fork 24 is transferable in both of left and right sides. A pair of mark sensors 26 are provided on both left and right ends of the elevation frame 22. The racks 30 are provided on the left and right sides of the travel rail 4. FIG. 2 shows part of the rack 30 on the right side of the travel rail 4. Reference numerals 32 denote pillars, and reference numerals 34 denote shelf supports. Marks 36 are provided at tip ends of the shelf supports 34 near the travel rail 4 such that the mark sensor 26 can detect the marks 36.

Figure 3:
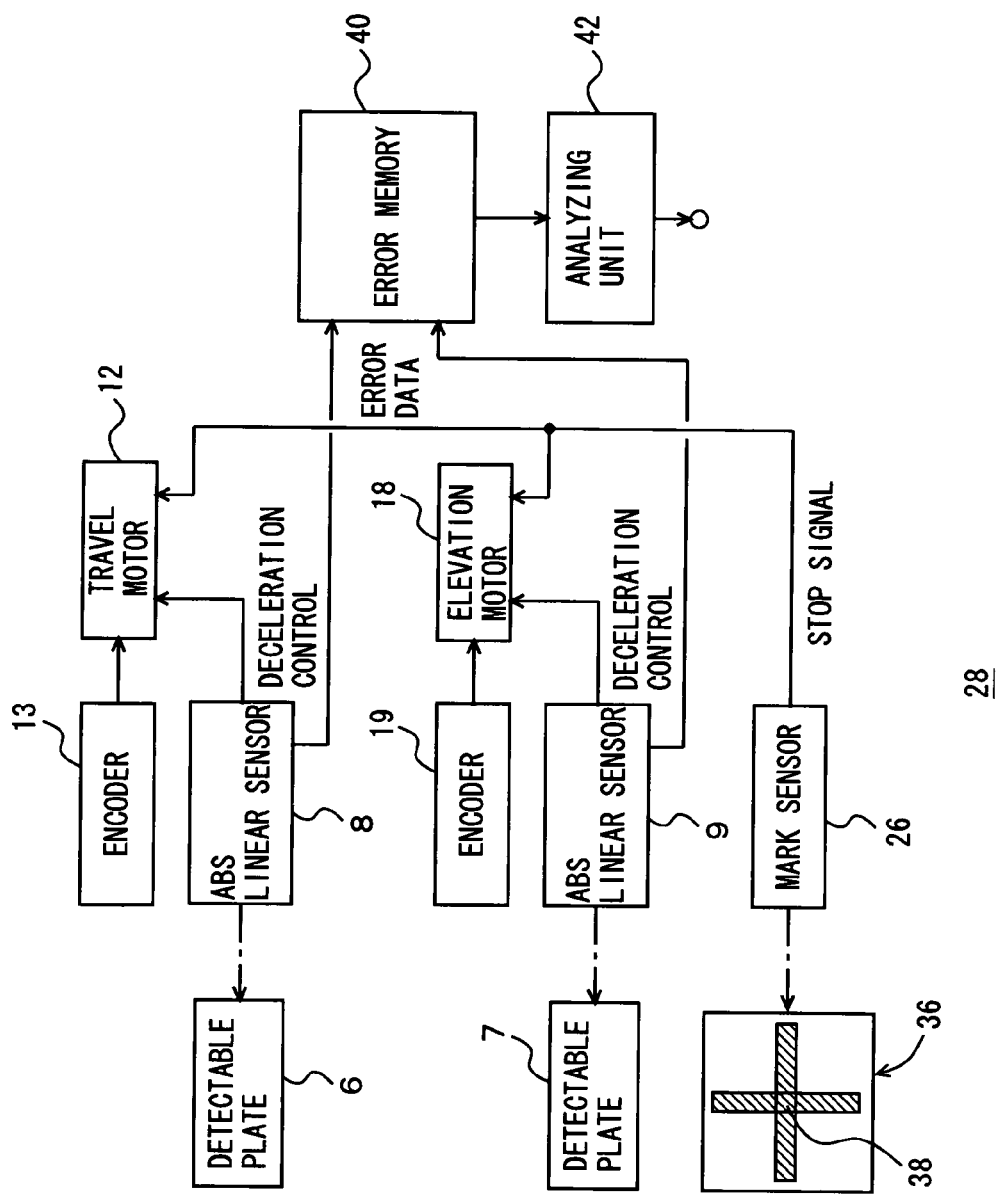
FIG. 3 is a block diagram showing a control device of the stacker crane in the embodiment.
Figure 4:
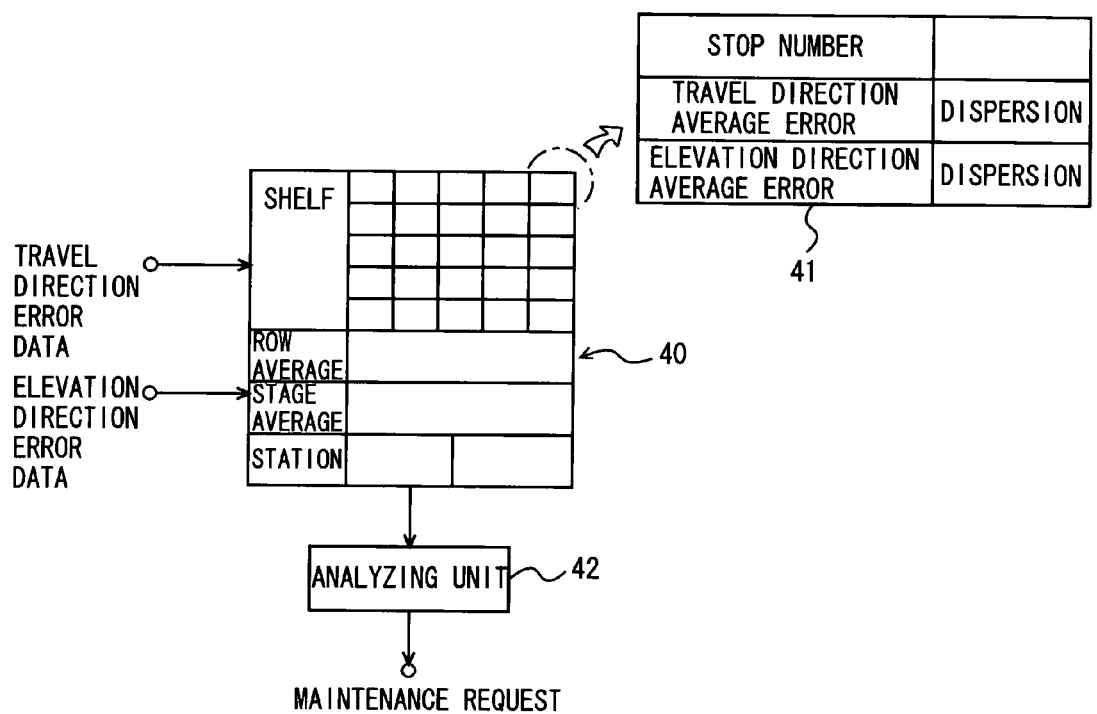
FIG. 4 is a view showing accumulation of errors of an ABS linear sensor in the embodiment.
Figure 5:
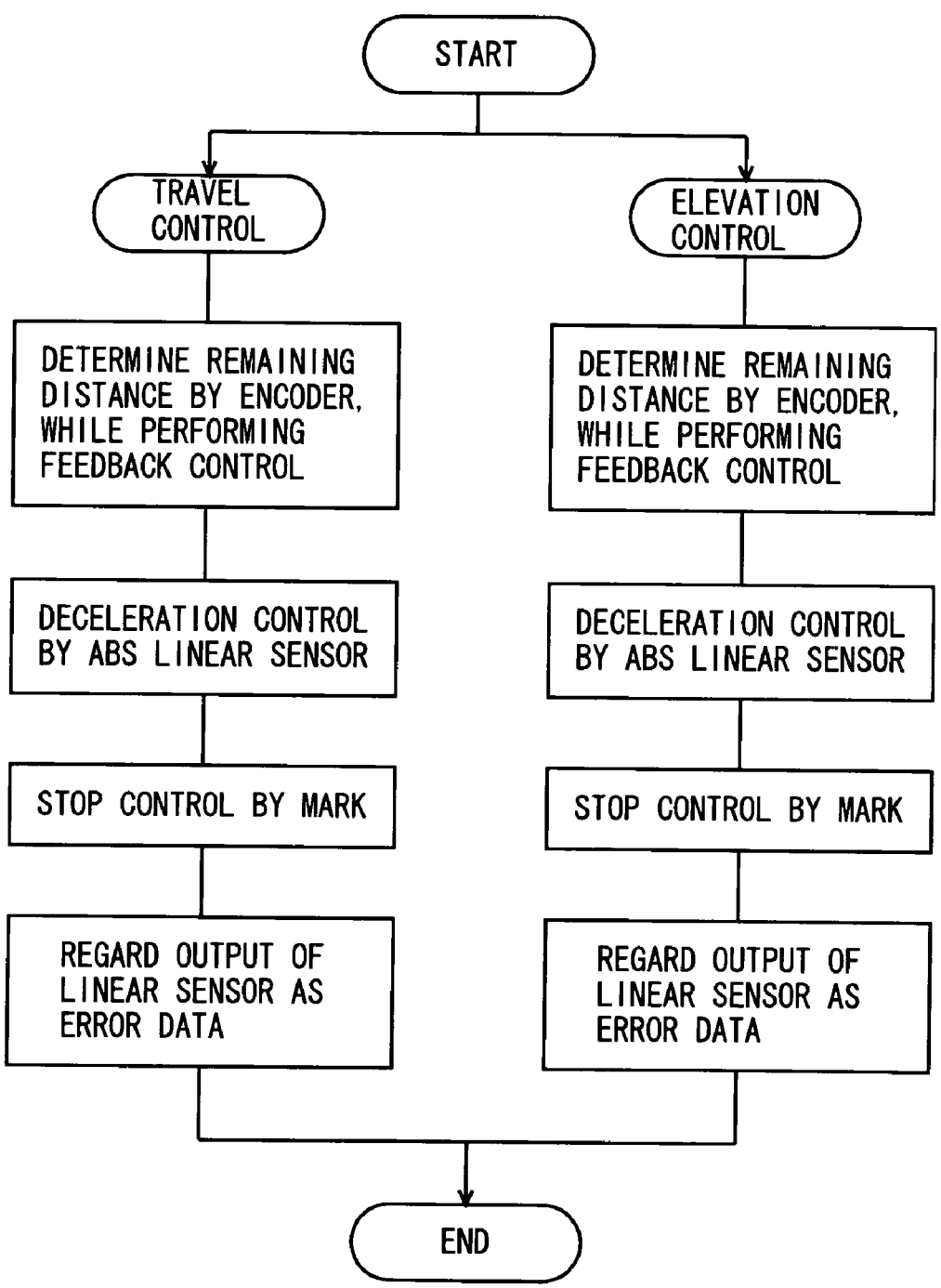
FIG. 5 is a flow chart showing an algorithm of travel control and elevation control of the stacker crane in the embodiment.

FIGS. 3 to 5 show the control device 28 according to the embodiment, and operation of the control device 28. In the drawings, the mark 36, the detectable plates 6, 7, and the motors 12, 18 are not part of the control device 28. The accumulated travel distance is calculated by the encoders 13, 19 based on the information of the travel motor 12 and the elevation motor 18. The remaining distance to the stop position (the shelf of the rack 30 or the station) is determined by the control device 28 to perform deceleration control. When the linear sensors 8, 9 detect the detectable plates 6, 7, the control is switched to the data of the linear sensors 8, 9 to perform deceleration control to stop the stacker crane 2 at the stop position. In the case where correction data used to correct the output of the linear sensors 8, 9 for each stop position (stop data for each stop position) is stored, deceleration control is performed in accordance with the correction value. In other cases, deceleration control is performed such that the outputs of the linear sensors 8, 9 become, e.g., 0. When a cross sign 38 in the mark 36 is detected by the mark sensor 26, a stop signal is outputted to stop the motors 12, 18 for braking. Using the cross sign 38, the stop position can be detected in the travel direction and the elevation direction independently. In the case of using the linear sensors 8, 9, the speed of the stacker crane 2 is reduced sufficiently at the position where the mark 36 can be detected, and thus, it is possible to suitably perform stop control of the motors 12, 18. Further, it is possible to shorten the travel segment where the stacker crane 2 travels very slowly before stopping. That is, the stacker crane 2 can stop swiftly. The shape of the mark 36, the type of the mark sensor 26, and the number of the mark sensors 26 can be determined arbitrarily.

When the motors 12, 18 are stopped, for example, by reading the outputs of the linear sensors 8, 9, it is possible to determine error data at the stop position. The error data is accumulated in the error memory 40. An analyzing unit 42 analyzes the accumulated value. If a predetermined condition is satisfied, the maintenance is requested. Error data 41 at the first address of the shelf is shown in FIG. 4. Statistics such as the number of stops at the shelf, the average error in the travel direction and the average error in the elevation direction, and the error dispersions are stored. If any of the average errors or the error dispersions has a predetermined value or more, the maintenance is requested. Additionally, the accumulated number of stops, the average error, and the error dispersion for each row in the vertical direction of the shelf, the accumulated number of stops, the average error, and the error dispersion for each stage in the horizontal direction of the shelf, and the accumulated number of stops, the average error, and the error dispersion for each station are stored.

Using the correction data in the memory 40, it is possible to improve the accuracy in deceleration control by the linear sensors 8, 9, and perform deceleration control so that the stacker crane 2 can stop just at the stop position. In the case where the correction data is not used in deceleration control, deceleration control is performed such that the stacker crane 2 stops at a target position before the stop position defined by the detectable plates 6, 7. The target position is ahead of the stop position by the distance corresponding to the error. From the target position, the stacker crane 2 moves at a very slow speed, and stops after detecting the mark 36. Thus, in the case where the outputs of the linear sensors 8, 9 are corrected by the correction data in the memory 40, the stacker crane 2 can stop swiftly without requiring the very slow movement.

The data in the memory 40 can be utilized for the maintenance of the rack 30, the station, and the stacker crane 2. If the error is large only at a certain shelf, and there are no errors in the other shelves in the same row or the same stage, the shelf in question may have a defect, e.g., the shelf support is deformed, the mark 36 is dirty, or the mark 36 is mounted inappropriately. In the case where the average error or the error dispersion in the row or stage is large, it is assumed that the positions of the detectable plates 6, 7 are not correct due to some mistakes in providing the detectable plates 6, 7 or deformation of the rack 30. If the error is large regardless of the shelf position, it is assumed that any of the travel wheels or the sieve is abraded, or the encoder has a failure.

The embodiment has the following features.

1) At the time of starting operation of the stacker crane 2, the stop position can be provided by the linear sensors 8, 9, and the detectable plates 6, 7. Thus, teaching of the stop position is not required. Therefore, it is possible to easily start operation of the automated warehouse. For example, assuming that there are hundreds of shelves, if teaching of the accurate stop position of the stacker crane at each of the shelves is required, such teaching would be very laborious. In the embodiment, laborious teaching is not required.

2) The encoders 13, 19 roughly calculate the remaining distance to start deceleration control. When the stacker crane 2 reaches a position where the detectable plates 6, 7 become detectable by the linear sensors 8, 9, the control is switched to the linear sensors 8, 9. When the speed is reduced sufficiently, the mark sensor 26 performs stop control. In this manner, the stacker crane 2 can stop correctly and swiftly. In particular, even if it is difficult to provide detectable plates 6, 7 in the shelf, it is possible to compensate for the difficulty by detecting the mark 36 using the mark sensor 26.

3) If the data of the stop position is corrected each time the stacker crane 2 stops at the shelf or the station, the stacker crane 2 can stop even more swiftly without requiring the very slow movement near the stop position.

4) It is possible to carry out the maintenance using the data in the error memory 40 in the case where deformation of the rack occurs, any of the detectable plates 6, 7, or the mark 36 is provided at an inappropriate position, or any of the wheels, the drive shaft, and the sieve of the stacker crane 2 is abraded.

Figure 6:
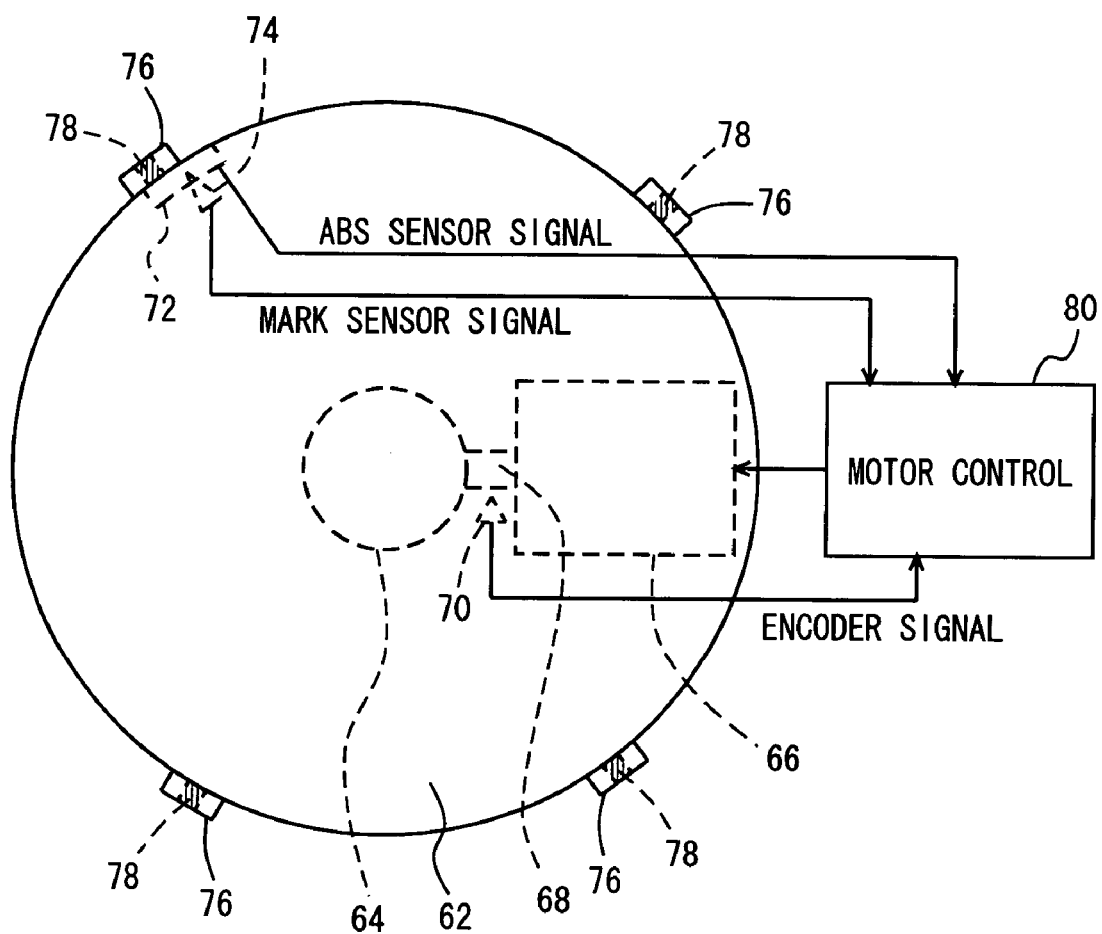
FIG. 6 is a plan view showing control of a turn table in a modified form of the embodiment.
Figure 7:
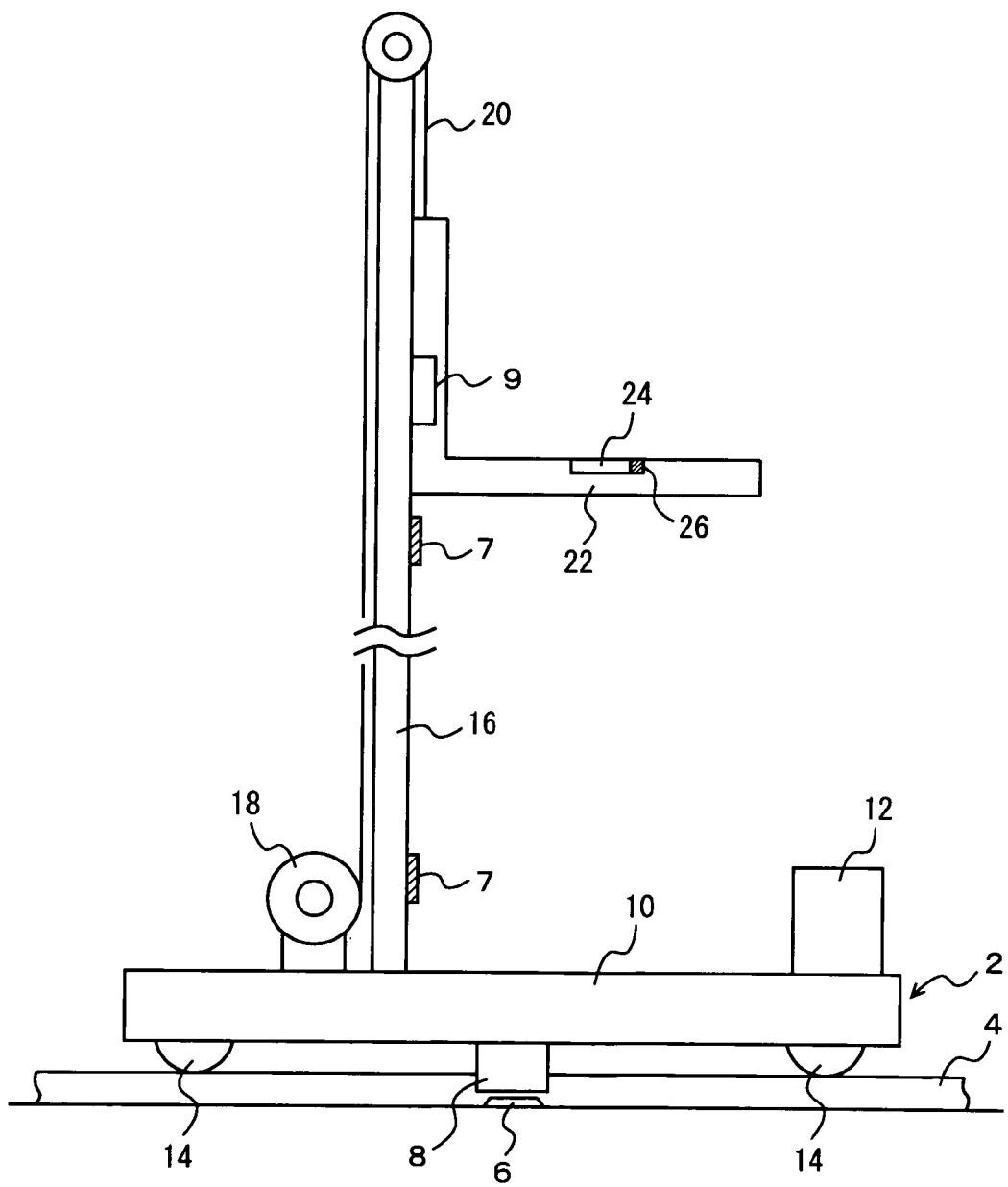
FIG. 7 is a side view showing main components of a stacker crane according to another embodiment.

FIG. 6 shows stop control of a turn table 60 according to a modified form of the embodiment. A reference numeral 62 denotes a body of the turn table 60, a reference numeral 64 denotes a rotary shaft, a reference numeral 66 denotes a rotary motor, and a reference numeral 68 denotes a drive shaft of the rotary motor 66. The encoder 70 detects the rotational amount of the drive shaft 68. A linear rotary sensor 72 comprises a plurality of detection coils arranged around the body 62, and determines the absolute distance to the stop position based on the positions of the detectable plates 76 which are arc-shaped magnetic objects provided around the body 62. The linear rotary sensor 72 linearly outputs data of rotation at the absolute position based on the positions of the detectable plates 76. Further, a mark sensor 74 detects marks 78 at the stop position.

In the modified form of the embodiment, a motor control device 80 performs deceleration control of the rotary motor 66 in accordance with the remaining distance to the stop position based on a signal from the encoder 70. When the linear rotary sensor 72 detects the detectable plates 76, the linear rotary sensor 72 performs deceleration control of the rotary motor 66. When the mark sensor 74 detects the marks 76, stop control is performed.

Although the embodiment has been described in connection with the case in which the stacker crane 2 is taken as an example of the two-dimensional movement, and the turn table 60 is taken as an example of one dimensional movement, the present invention can be utilized for traveling of an overhead traveling vehicle, a rail vehicle, or an automated guided vehicle, movement of a hand of a transfer robot, operation of setting tools or parts in a working machine.

FIGS. 7 to 12 show another embodiment and its modified form. In FIGS. 7 to 10, a reference numeral 2 denotes a stacker crane, and a reference numeral 4 denotes a travel rail. A reference numeral 6 denotes a detectable plate fixed on the ground. For example, the detectable plate 6 is a magnetic plate. In FIG. 6, the detectable plate 6 is shown at a position near the travel rail 4. Alternately, the detectable plate 6 may be provided at the bottom of a rack (not shown). A plurality of the detectable plates 6 are provided at intervals at target positions in the travel direction. A reference numeral 8 denotes an ABS liner sensor having a plurality of coils (not shown). The ABS linear sensor 8 detects an absolute position of the stacker crane 2 in the horizontal direction based on the position of the detectable plate 6 by the change in the magnetic coupling with the magnetic detectable plate 6. The ABS linear sensor 8 can detect the absolute position based on the position of the detectable plate 6. Since a plurality of the detectable plates 6 are provided at intervals, the position detection is not possible at positions where the plate 6 is not present. Instead of using the ABS linear sensor 8, any sensor may be used as long as it can detect the absolute position based on the target stop position.

A reference numeral 10 denotes a cart, a reference numeral 12 denotes a travel motor, and reference numerals 14 denote travel wheels. An encoder (not shown) monitors the rotation number of the travel motor 12 or the rotation number of the travel wheel 14 to calculate the travel distance. A reference numeral 16 denotes a mast. A plurality of detectable plates 7 are provided at positions in correspondence with positions of shelves arranged vertically along the rack 30 (not shown). An ABS linear sensor 9 provided at the elevation frame 22 is used for detecting the detectable plates 7, and the elevation frame 22 is stopped at the target height stored for each shelf. The detectable plates 7 are provided at intervals. The ABS linear sensor 9 detects the absolute positions based on the positions of the respective detectable plates 7. A reference numeral 18 denotes an elevation motor. A reference numeral 20 denotes a suspension member such as a belt, a wire, or a rope. A reference numeral 22 denotes the elevation frame, and a slide fork 24 as an example of transfer means is provided at the elevation frame 22. A mark sensor 26 using an image sensor or the like is provided at a tip end of the slide fork 24. Further, the travel motor 12 and the elevation motor 18 may not be in the form of rotary motors. Instead of the rotary motor, a liner motor or an actuator such as a servo cylinder may be used for the travel motor 12 or the elevation motor 18.

Figure 8:
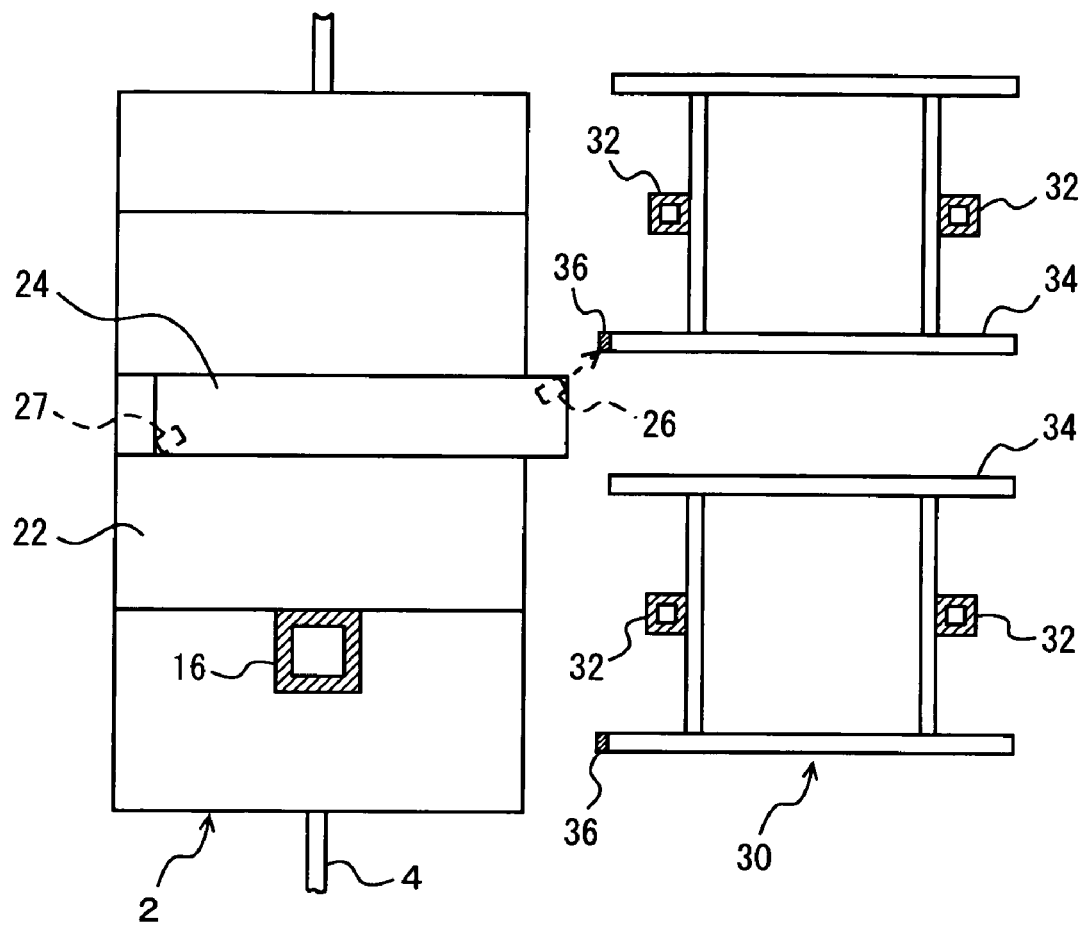
FIG. 8 is a plan view showing an elevation frame of the stacker crane and marks provided at shelf supports of a rack as stop positions in the other embodiment.

As shown in FIG. 8, the slide fork 24 is transferable in both of left and right sides. A pair of mark sensors 26, 27 are provided on both left and right ends of the elevation frame 22. The racks 30 are provided on the left and right sides of the travel rail 4. FIG. 8 shows part of the rack 30 on the right side of the travel rail 4. Reference numerals 32 denote pillars, and reference numerals 34 denote shelf supports. Marks 36 are provided at tip ends of the shelf supports 34 near the travel rail 4. The mark 36 is detected using mark sensors 26, 27 by moving the slide fork 24 toward the rack 30 to reduce the distance to the rack 30.

Figure 9:
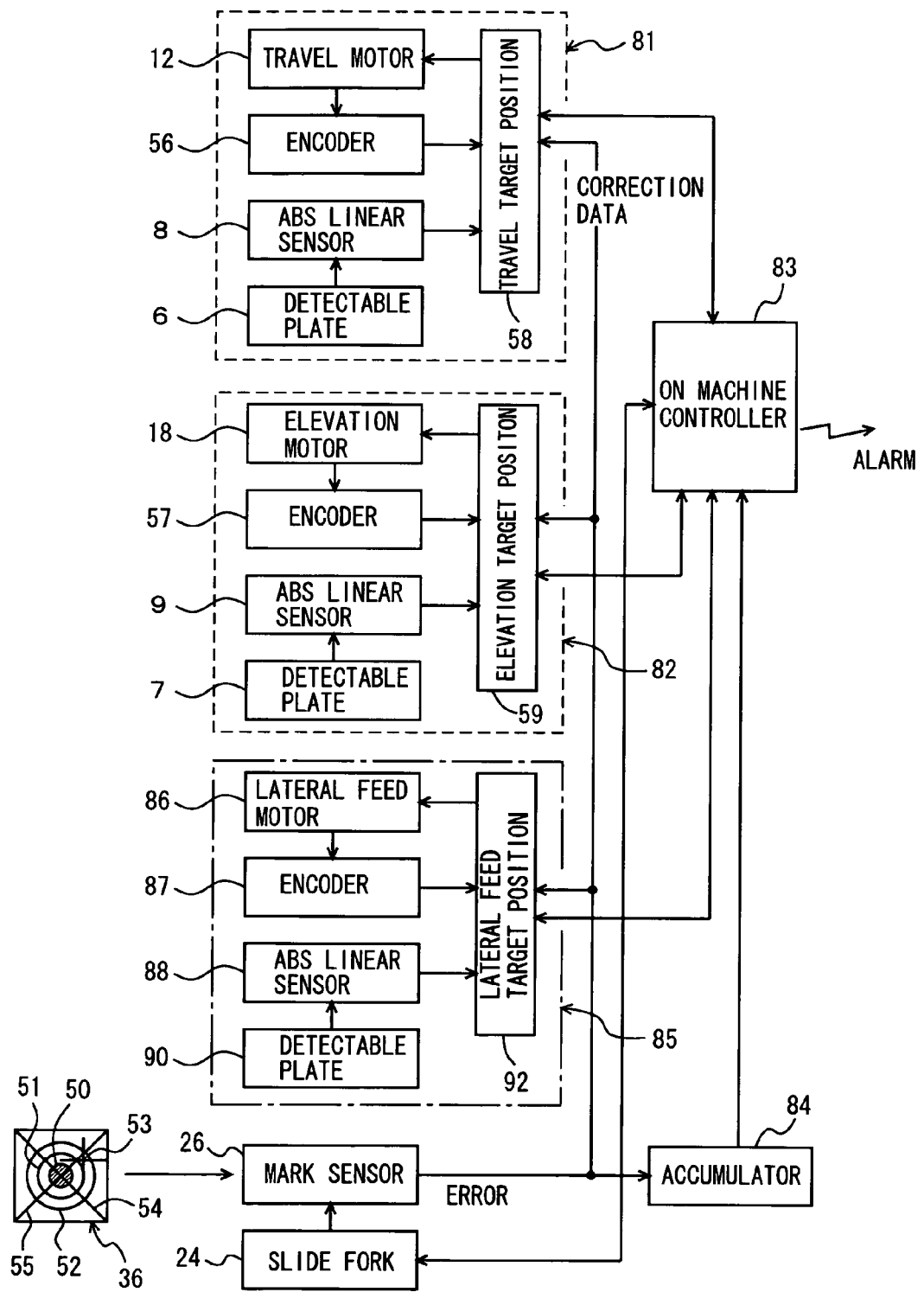
FIG. 9 is a block diagram showing a control system of the stacker crane in the other embodiment.

Referring to FIG. 9, a mark indicating a target area 50 is provided at the center of the mark 36, and two concentric circles 51, 52 are provided around the target area 50. A reference numeral 53 denotes the center of the viewing field of the mark sensor 26. The mark sensor 26 evaluates the error of the stop position by detecting the position of the viewing field center 53 in the mark 36. That is, if the viewing field center 53 is within the target area 50, the slide fork 2 stops correctly at the stop position. If the viewing field center 53 is between the concentric circle 51 and the target area 50, there is an error of a first level. If the viewing field center 53 is between the concentric circles 51 and 52, there is an error of a second level. If the viewing field center 53 is outside the concentric circle 52, there is an error of a retry level. In this case, after returning the slid fork 24, the stacker crane 2 moves back to a known position, and travels again toward the same shelf for retrial.

After the error level is determined, the error direction is determined. For this purpose, it is checked in which direction the target area 50 can be seen from the viewing field center 53. Reference numerals 54, 55 denote border lines dividing the mark 36 into four quadrants. In the case where the viewing field center 53 is between the concentric circle 51 and the target area 50 at the stop position, based on the information as to in which quadrant the viewing field center 53 is positioned, data of the travel target position or the elevation target position is corrected by one unit. In the case where the viewing field center 53 is between the concentric circle 51 and the concentric circle 52, likewise, based on the information as to in which quadrant the viewing field center 53 is positioned, the data of the travel target position or the elevation target position is corrected by two units. It should be noted that the shape of the mark or the type of the mark sensor can be selected arbitrarily as long as the sensor can detect the error of the stop position in the travel direction and the elevation direction, and the sensor has the sufficient resolution corresponding to the required positioning accuracy. Further, the correction can be made in a manner that the detected error of the travel target position or the elevation target position is added to or subtracted from the data directly.

The encoder 56 monitors the rotation number of the travel motor 12 or the rotation number of the travel wheels, and inputs the travel distance to a travel target position memory 58. The travel target position memory 58 stores data for each of stop positions as targets such as shelves or stations, and corrects the position data at each of the stop positions. The ABS linear sensor 8 detects the absolute position based on the position of the detectable plate 6, and inputs data of the absolute position to the travel target position memory 58. These elements form a travel drive unit 81. In an elevation drive unit 82, an encoder 57 detects the rotation number of the elevation motor 18, or detects the elevation distance along the mast 16, and inputs data of the detected rotation number or the elevation distance to an elevation target stop position memory 59. Further, the ABS linear sensor 9 detects the absolute position based on the position of the detectable plate 7, and inputs data of the detected absolute position to the elevation target stop position memory 59. In the same manner as described above, the elevation target position memory 59 stores data for each of stop positions as targets such as shelves or stations, and corrects the position data at each of the stop positions.

A reference numeral 83 denotes an on machine controller for controlling drive units 81, 82 or the like to correct the target positions stored in the target position memories 58, 59 based on the error levels determined by the mark sensor 26. The error levels determined by the mark sensor 26 are accumulated by an accumulator 84. In the accumulation, if the stop position is shifted to the right or shifted upwardly from the target area 50, the error data is added, and if the stop position is shifted to the left or shifted downwardly from the target area 50, the error data is subtracted. Thus, if the positions of the viewing field center 53 that were detected when the stacker crane 2 stopped are randomly distributed near the target area 50, the absolute value of the accumulated value is small. When the absolute value of the accumulated value becomes a predetermined value or more, the on machine controller (maintenance request means) 83 issues an alarm to request the maintenance of the stacker crane 2 or the rack. For example, if the viewing field center 53 at the stop position is outside the concentric circle 52 of the mark 36, i.e., if it is determined that there is an error of the retry level, a large number such as "5" is added or subtracted from the accumulated value by the accumulator 84 depending on the error direction. If the absolute value of the accumulated value calculated by the accumulator 84 reaches, e.g., 10 or more, the maintenance is requested. This indicates a case in which the maintenance of a control system is required because it was not possible to stop the stacker crane 2 within an allowable range twice or more successively, or the errors were accumulated in the same direction. It should be noted that accumulation by the accumulator 84 is not performed within a predetermined period after starting operation of the stacker crane 2 since data of the target stop position is not stable in this period.

In the case where the embodiment is applied to an overhead traveling vehicle instead of the stacker crane, a lateral feed unit 85 as shown by a chain line in FIG. 9 is provided. A reference numeral 86 denotes a lateral feed motor. A reference numeral 87 denotes an encoder for determining the lateral feed distance by a lateral feed motor 86. Further, an ABS linear sensor 88 determines the lateral feed distance relative to a detectable plate 90 provided in the overhead traveling vehicle, and inputs the lateral feed distance in a lateral feed target position memory 92. In the case where the stroke of lateral feeding is short, and the entire stroke of lateral feeding can be monitored by the ABS linear sensor 88, the encoder 87 is not required.

Figure 10:
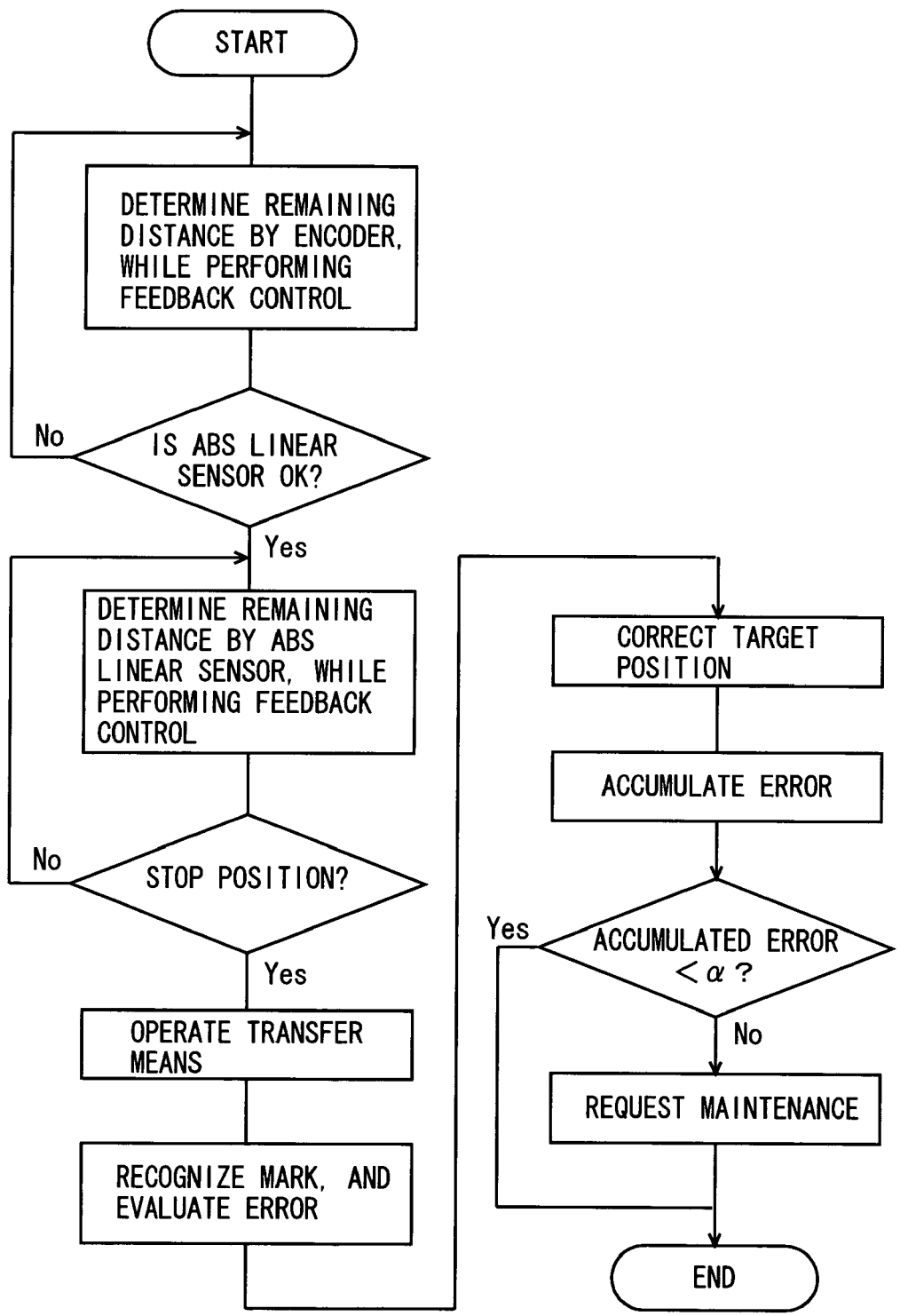
FIG. 10 is a flow chart showing an algorithm of travel control and elevation control of the stacker crane in the other embodiment.

Operation in the embodiment is shown in FIG. 10. When a travel target position such as a shelf of a rack or a storage/retrieval station is given, the remaining travel distance and the remaining elevation distance are determined by the encoders. Based on these items of data, a target function of a travel command is generated. While performing the feedback control, the stacker crane is moved along the travel rail or elevated/lowered. When the stacker crane moves into a segment where stop control using the ABS linear sensor can be performed, the ABS linear sensor determines the remaining distance based on the position of the detectable plate to perform the fully closed feedback control, and stops the stacker crane. Next, transfer means such as a slide fork or a scalar arm is operated. A mark is recognized by a mark sensor provided at the tip end of the transfer means, and the error is evaluated. At the time the mark is recognized by the mark sensor, the stacker crane has already been stopped. Since the transfer means is in operation, unless there is no error of the retry level, without moving the stacker crane along the travel rail or elevating/lowering the stacker crane again, the error (difference) from the target position is evaluated to make correction, and the data is used in the control from the next time. Further, the accumulator accumulates the error, and if the accumulated error reaches a predetermined value α or more, the maintenance is requested, and the control system, the rack, or the like are inspected. If there is any error of the retry level, the stacker crane returns to a known position, and tries to stop at the same target position again.

The embodiment has the following features.
1) It is sufficient to provide a roughly estimated value of the target position initially. In the beginning, teaching of the correct target position is not required. Thus, it is possible to easily start operation of the automated warehouse or the like. For example, assuming that there are hundreds of shelves, if teaching of the travel target position and the elevation target position of the stacker crane at each of the shelves is required, such teaching would be very laborious. In the embodiment, laborious teaching is not required.

2) Then, each time the stacker crane stops at a shelf or a retrieval/storage station, it is possible to correct the error of the target position. In the embodiment, the error of the target position is corrected each time the stacker crane stops. Alternatively, for example, the correction may be made every other time.

3) Even if any error occurs in the stop control due to gradual deformation of the rack, or abrasion of the wheels due to operation of the stacker crane for a long period of time, such an error can be corrected by continuous correction of the target position using the mark sensor.

4) Further, since the correction of the same target position can be made repeatedly a large number of times, even if the correction amount per one time is small, it is possible to obtain the correct target position gradually. Further, it is not necessary to stop transportation for teaching to correct the change over time. Correction can be made during the actual operation.

5) The error and the correction amount for correcting the error may not have the one to one correspondence. For example, in the case of multiaxis control, in particular, in the case where the movement directions of the respective axes are not perpendicular to each other, the relationship between the error and the correction amount is complicated. However, in the embodiment, small correction relative to the error is made such that the error becomes within an allowable range, and no excessive correction occurs. Thus, in any cases, it is possible to perform the control for allowing the stacker crane to stop within an allowable range.

While the embodiments have been described in connection with the cases in which the invention is applied to the stacker crane 2, the type of the transportation apparatus can be selected arbitrarily. For example, the invention is applicable to an overhead traveling vehicle, a rail vehicle which travels on the ground, or a non-rail automated guided vehicle which travels on the ground. Further, the mark sensor may not be an image sensor. Any sensor can be used as the mark sensor as long as it can detect the error of the stop position based on the position of the mark, while classifying the error in one of error levels. Further, in the embodiment, both of control by the encoder and control by the ABS linear sensor are performed. Alternatively, only stop control by the encoder may be performed.

Figure 11:
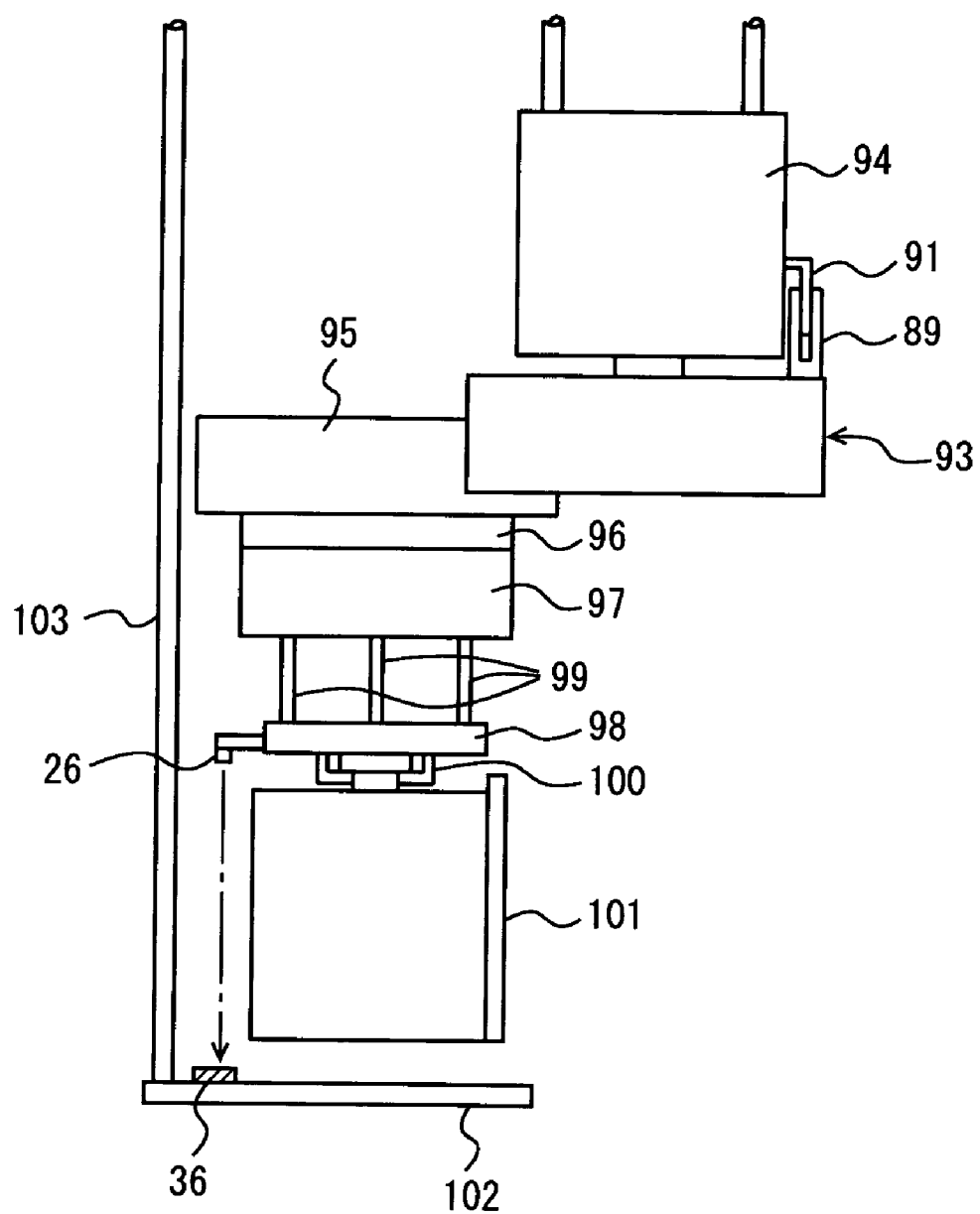
FIG. 11 is a view schematically showing a state in which an overhead traveling vehicle is detecting a mark on a buffer in a modified form of the other embodiment.
Figure 12:
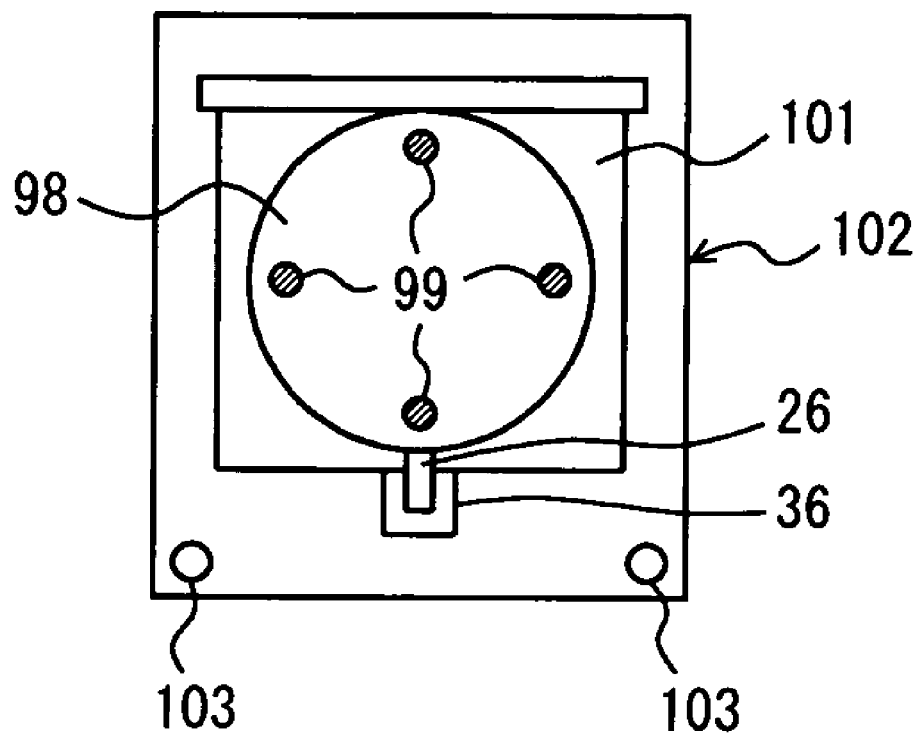
FIG. 12 is a plan view showing the relationship between the elevation frame of the overhead traveling vehicle and the mark on the buffer.

FIGS. 11 and 12 show an example in which the present invention is applied to an overhead traveling vehicle 93. The travel control of the overhead traveling vehicle 93 can be performed in the same manner as in the case of the stacker crane 2, and the control by the travel drive unit 81 shown in FIG. 9 is used. As for the elevation control, the load applied to the elevation frame is measured, and at the time when the load changes sharply, the downward movement of the elevation frame is stopped. After hoisting of the elevation frame is finished, the upward movement of the elevation frame is finished. Thus, the elevation control itself is easy. For the elevation, positional detection by the ABS linear sensor, and error correction are not performed. The lateral feed unit 85 is provided for transfer of an article to a position which is not just under the overhead traveling vehicle 93. Therefore, the control and error collection in the lateral feeding direction are performed.

In FIG. 11, a reference numeral 93 denotes an overhead traveling vehicle. The overhead traveling vehicle 93 travels along a travel rail 94 provided on a ceiling or the like in a clean room. A travel drive unit (not shown) of the overhead traveling vehicle 93 is provided inside the travel rail 94. A reference numeral 89 denotes an ABS linear sensor. A reference numeral 91 denotes a detectable plate such as a magnetic object. Preferably, the detectable plate 91 is provided at each stop position. A reference numeral 95 denotes a movable object in the lateral feed unit. The movable object 95 moves in a direction which is substantially perpendicular to the travel rail 94 in a horizontal plane. Though not shown, the ABS linear sensor or the encoder detects the lateral feed distance. A reference numeral 96 denotes a rotary unit for rotating the elevation drive unit 97 in a horizontal plane. The rotary unit 96 may not be provided. A reference numeral 98 denotes an elevation frame which is elevated/lowered relative to the elevation drive unit 97 by suspension members 99. The elevation frame 98 has a chuck 100 for chucking an article in a cassette 101. A reference numeral 102 denotes a buffer. The article is transferred to/from the buffer 102. The buffer 102 may be in the form of a load port. At a predetermined position of the buffer 102, the mark 36 is provided. While lowering the elevation frame 22, the mark sensor 26 protruding from the elevation frame 22 in a horizontal plane detects the mark 36. A reference numeral 103 denotes a pillar of the buffer 102. FIG. 12 shows an example of the layout of the mark sensor 26 of the elevation frame 98 relative to the mark 36 of the buffer 102.

Also in the case of FIGS. 11 and 12, by lowering the elevation frame 98, it is possible to easily recognize the mark 36 using the mark sensor 26. Depending on the error level evaluated at this time, the travel target position and the lateral feed target position are corrected. The other features are same as in the case of the stacker crane 2.

The invention claimed is:

1. A control device for determining a position of a movable object relative to a stop position by a sensor to stop the movable object at the stop position, the control device comprising:
    an encoder for detecting a movement distance of the movable object;
    a linear sensor for outputting a linear output for an absolute distance from a position before the stop position to the stop position; and
    a mark sensor for detecting a mark provided at the stop position, wherein as the movable object gets closer to the stop position, a control is switched in an order of the encoder, the linear sensor, and the mark sensor to stop the movable object at the stop position.

2. The control device according to claim 1, further comprising means for correcting the absolute distance to the stop position outputted by the linear sensor, in response to the result of detection of the mark by the mark sensor.

3. The control device according to claim 1, further comprising:
    means for determining an error in the output of the linear sensor at the stop position in response to the result of detection of the mark by the mark sensor;
    means for accumulating the determined error; and
    means for requesting a maintenance of the movable object or a maintenance on the stop position side if the accumulated error satisfies a predetermined condition.

4. A transportation apparatus for transferring an article, the transportation apparatus being configured to stop in accordance with data of a target stop position which is stored in advance for a stop position, the transportation apparatus comprising:

means for detecting a mark provided at the stop position, at the time of stopping at the stop position during actual transportation of the article;

means for determining an error in data of the target stop position based on data provided by the detection means; and means for correcting the data of the target stop position from next time based on the determined error.

5. The transportation apparatus according to claim 4, further comprising a linear sensor for detecting an absolute position based on the stop position to stop at the stop position by a fully closed stop control using the linear sensor.

6. The transportation apparatus according to claim 4, further comprising transfer means for transferring the article by moving back and forth from/to the stop position, wherein the transfer means is provided with the detection means for detecting the mark in a state in which the transfer means has moved forward to the stop position.

* * * * *